United States Patent
Nishiura et al.

(10) Patent No.: US 8,801,094 B2
(45) Date of Patent: Aug. 12, 2014

(54) VEHICLE SEAT

(75) Inventors: Takeshi Nishiura, Nisshin (JP); Takao Sakurai, Okazaki (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 71 days.

(21) Appl. No.: 13/597,566

(22) Filed: Aug. 29, 2012

(65) Prior Publication Data

US 2013/0057035 A1 Mar. 7, 2013

(30) Foreign Application Priority Data

Sep. 5, 2011 (JP) ................................. 2011-192301

(51) Int. Cl.
*A47C 7/24* (2006.01)
*A47C 31/02* (2006.01)

(52) U.S. Cl.
USPC ................. 297/218.1; 297/218.3; 297/452.56

(58) Field of Classification Search
USPC ......... 297/218.1, 218.3, 218.5, 218.2, 452.56
See application file for complete search history.

(56) References Cited

U.S. PATENT DOCUMENTS

| | | | | |
|---|---|---|---|---|
| 2,728,382 | A * | 12/1955 | Baranski | 297/218.3 |
| 3,273,178 | A * | 9/1966 | Baruth et al. | 297/218.1 X |
| 3,281,185 | A * | 10/1966 | Albinson et al. | 297/218.5 X |
| 4,296,964 | A * | 10/1981 | Haack | 297/218.1 |
| 4,740,035 | A * | 4/1988 | Kazaoka et al. | 297/218.1 X |
| 4,928,334 | A * | 5/1990 | Kita | 297/452.56 X |
| 5,013,089 | A * | 5/1991 | Abu-Isa et al. | 297/452.56 X |
| 5,023,125 | A * | 6/1991 | Gray | 297/218.1 X |
| 5,028,472 | A * | 7/1991 | Gray | 297/218.1 X |
| 6,241,188 | B1 * | 6/2001 | Simpson et al. | 297/218.1 X |
| 6,378,949 | B1 * | 4/2002 | Maeda et al. | 297/452.56 |
| 6,406,093 | B1 * | 6/2002 | Miotto et al. | 297/218.5 |
| 6,485,103 | B1 * | 11/2002 | Yamada et al. | 297/218.3 X |
| 6,726,278 | B1 * | 4/2004 | Albright et al. | 297/218.1 |
| 7,128,371 | B2 * | 10/2006 | Kawasaki et al. | 297/218.1 X |
| 7,134,718 | B2 * | 11/2006 | Yasuda et al. | 297/218.1 X |
| 7,255,404 | B2 * | 8/2007 | Neale | 297/218.1 X |
| 7,568,761 | B2 * | 8/2009 | Mashimo | 297/218.1 X |
| 7,837,263 | B2 * | 11/2010 | Booth et al. | 297/218.1 |
| 7,901,002 | B2 * | 3/2011 | Mashimo | 297/218.3 |
| 8,061,780 | B2 * | 11/2011 | Tsuji et al. | 297/218.1 X |
| 8,240,759 | B2 * | 8/2012 | Hobl et al. | 297/218.1 |
| 2013/0057035 | A1 * | 3/2013 | Nishiura et al. | 297/218.3 |

FOREIGN PATENT DOCUMENTS

JP 2002-233437 8/2002

* cited by examiner

*Primary Examiner* — Rodney B White (74) *Attorney, Agent, or Firm* — Greenblum & Bernstein P.L.C.

(57) ABSTRACT

A vehicle seat including a three-dimensional woven knitted fabric including a surface-layer-side base fabric, a back-layer-side base fabric, and an intermediate layer that three-dimensionally connects the surface-layer-side base fabric and the back-layer-side base fabric, the three-dimensional woven knitted fabric being tightly stretched on a seat frame by a locking member provided to an end portion thereof to form a seat surface, wherein an edge portion of the three-dimensional woven knitted fabric has a single-layer structure, which includes only the back-layer-side base fabric among the surface-layer-side base fabric, the back-layer-side base fabric and the intermediate layer, and wherein the locking member is provided to an end portion of the back-layer-side base fabric.

4 Claims, 6 Drawing Sheets

VEHICLE SEAT

CROSS-REFERENCE TO RELATED APPLICATIONS

This application claims priority from Japanese Patent Application No. 2011-192301 filed on Sep. 5, 2011, the entire contents of which are incorporated herein by reference.

TECHNICAL FIELD

Aspects of the invention relate to a vehicle seat including a three-dimensional woven knitted fabric having a surface-layer-side base fabric, a back-layer-side base fabric, and an intermediate layer for three-dimensionally connecting the surface-layer-side base fabric and the back-layer-side base fabric, in which the three-dimensional woven knitted fabric is tightly stretched on a seat frame by a locking member provided on an end portion thereof to form a seat surface.

BACKGROUND

This type of vehicle seat includes a woven knitted fabric of a net shape that is tightly stretched on a seat surface instead of a pad material made of foamed resin for the purpose of reducing weight, improving air permeability, etc., and is referred to as a so-called net seat. The net seat of the related art utilizes a net of single-layer structure configured by one sheet of woven knitted fabric. In the net seat of the related art, there is a problem in cushion property (level of sitting comfort).

JP-A-2002-233437 aims to improve the cushion property (level of sitting comfort) by tightly stretching a three-dimensional woven knitted fabric having a surface-layer-side base fabric, a back-layer-side base fabric, and an intermediate layer that three-dimensionally connects the surface-layer-side base fabric and the back-layer-side base fabric. The three-dimensional woven knitted fabric employs the base fabric made of the same woven knitted fabric for both surface and back layer sides, and an almost entire surface is formed in a uniform three dimensional structure along an edge portion thereof. In addition, a locking member is sewed to an end portion of the three-dimensional woven knitted fabric including the surface-layer-side base fabric. The three-dimensional woven knitted fabric is tightly stretched by locking the locking member to a wire provided along the seat frame.

In this type of net seat, a load from a passenger is applied as tension acting in a surface direction to the three-dimensional woven knitted fabric. However, in JP-A-2002-233437, the surface-layer-side base fabric is sewed to the locking member together with the back-layer-side base fabric. Since the surface-layer-side base fabric and the back-layer-side base fabric are locked to the seat frame, if the load is applied from the passenger to the three-dimensional woven knitted fabric, the tension also acts on the surface-layer-side base fabric in the surface direction, so that the surface-layer-side base fabric is tensed. This causes the cushion property of the three-dimensional woven knitted fabric to deteriorate, thereby making the level of sitting comfort worse.

Furthermore, since the same base fabric is used for both the surface and back layer sides, there is a problem in that the surface-layer-side base fabric, to which the load is preferentially applied from the passenger, is tensed more than the back-layer-side base fabric. Also, since the intermediate layer is formed along the edge portion of the three-dimensional woven knitted fabric and lacks flexibility at the edge portion, when the locking member is locked to the seat frame, uneven tension may be applied to the edge portion or creases may be formed at the edge portion.

SUMMARY

Accordingly, the present invention has been made to solve the above-described problems occurring in the prior art, and an object of the present invention is to provide a vehicle seat including a three-dimensional woven knitted fabric, in which a back-layer-side base fabric receives a load from a passenger, so that a surface-layer-side base fabric is not tensed and thus has a good cushion property.

According to a first aspect of the invention, there is provided a vehicle seat including a three-dimensional woven knitted fabric including a surface-layer-side base fabric, a back-layer-side base fabric, and an intermediate layer that three-dimensionally connects the surface-layer-side base fabric and the back-layer-side base fabric, the three-dimensional woven knitted fabric being tightly stretched on a seat frame by a locking member provided to an end portion thereof to form a seat surface, wherein an edge portion of the three-dimensional woven knitted fabric has a single-layer structure, which includes only the back-layer-side base fabric among the surface-layer-side base fabric, the back-layer-side base fabric and the intermediate layer, and wherein the locking member is provided to an end portion of the back-layer-side base fabric.

According to a second aspect of the invention, there is provided a vehicle seat including a three-dimensional woven knitted fabric having a surface-layer-side base fabric, a back-layer-side base fabric, and an intermediate layer that three-dimensionally connects the surface-layer-side base fabric and the back-layer-side base fabric, the three-dimensional woven knitted fabric being tightly stretched on a seat frame by a locking member provided to an end portion thereof to form a seat surface, wherein an edge portion of the three-dimensional woven knitted fabric has a double-layered structure, which includes the surface-layer-side base fabric and the back-layer-side base fabric which are directly laminated without the intermediate layer therebetween, wherein the locking member is provided to an end portion of the edge portion having the double-layered structure, and wherein the surface-layer-side base fabric has a higher elasticity than that of the back-layer-side base fabric.

According to a third aspect of the invention, there is provided a vehicle seat including: a seat frame; a woven knitted fabric including, a first base fabric, a second base fabric, and an intermediate layer; and a locking member that tightly stretches the woven knitted fabric to the seat frame to form a seat surface, wherein the first base fabric, the intermediate layer and the second base fabric are laminated in this order in a first direction perpendicular to the seat surface, wherein a portion of the second base fabric extends further outwards in a second direction parallel to the seat surface than the first base fabric and the intermediate layer, and wherein the locking member is provided to the portion of the second base fabric that extends further outwards in the second direction.

Herein, a front of the three-dimensional woven knitted fabric means an outer side of the seat and a back of the three-dimensional woven knitted fabric means an inner side of the seat.

According to the first aspect, the locking member is provided to only the back-layer-side base fabric. In other words, an end portion of the surface-layer-side base fabric is a free end. Accordingly, a load applied from a passenger is received by only the back-layer-side base fabric that is locked to the seat frame, and thus tension is not applied to the surface-layer-side base fabric. As a result, the surface-layer-side base fabric can be freely deformed together with the intermediate layer, thereby securing a good cushion property.

According to the second aspect, the locking member is provided to the end portion including the surface-layer-side base fabric as well as the back-layer-side base fabric, but the surface-layer-side base fabric has elasticity, that is, deformability, higher than that of the back-layer-side base fabric. Therefore, the surface-layer-side base fabric can turn aside the load applied from the passenger by its elasticity. While the load applied from the passenger is received by the back-layer-side base fabric, the surface-layer-side base fabric can be freely deformed together with the intermediate layer, thereby bringing out a good original cushion property (level of sitting comfort). In addition, since the intermediate layer is not formed at the edge portion, flexibility is high at the edge portion, and the locking member is easily locked to the back frame. Additionally, it is possible to prevent the tension from being uneven at the edge portion or prevent creases from being formed at the edge portion.

DETAILED DESCRIPTION

First Exemplary Embodiment

Figure 1:
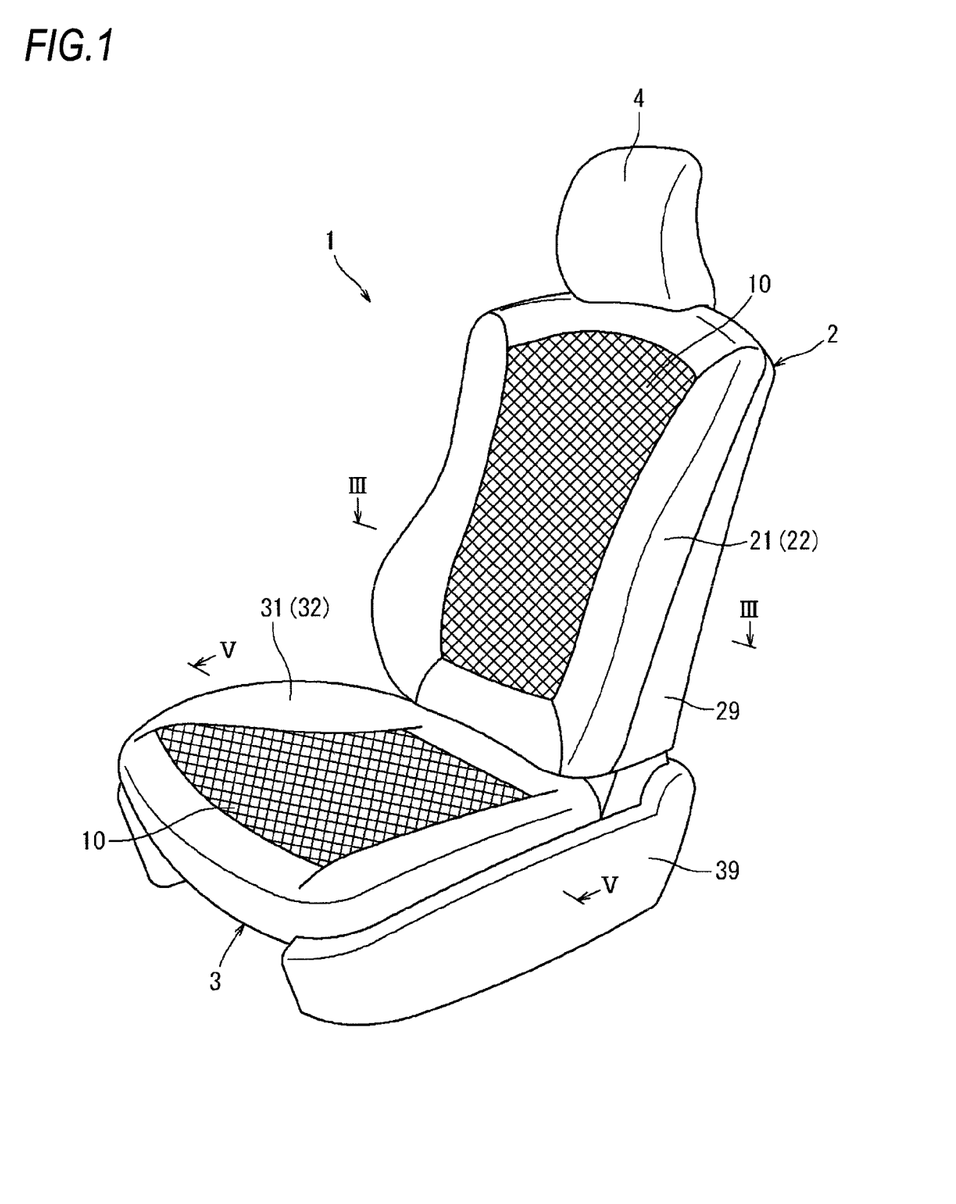
FIG. 1 is a perspective view illustrating a vehicle seat according to a first exemplary embodiment.

Hereinafter, typical embodiments of the invention will now be described with reference to the accompanying drawings. A seat 1 is installed in a vehicle such as an automobile, and includes, as illustrated in FIG. 1, a seat back 2 serving as a backrest, a seat cushion 3 serving as a seating portion, and a headrest 4 for supporting a head of a passenger. In the first exemplary embodiment, the seat back 2 and the seat cushion 3 have a seat surface (a surface of the seat back 2 facing a front side of the vehicle and a surface of the seat cushion 3 facing an upper side of the vehicle) for supporting the passenger, and a portion of the seat surface is made of a three-dimensional woven knitted fabric of a net shape 10 (hereinafter, referred to as a three-dimensional net).

Specifically, the seat surface of the seat back 2 and the seat cushion 3 includes the three-dimensional net 10 placed at each center portion thereof, and a back pad 21 and a cushion pad 31 placed around four sides of the three-dimensional net 10 and serving as a pad material. The back pad 21 and the cushion pad 31 are made of foamed resin consisting of foamed polyurethane, and its surface is coated with skin materials 22 and 32 (see FIGS. 3 and 5). The back pad 21 and the cushion pad 31 are respectively set up on the surface side of the three-dimensional net 10 in an overlap way to cover an edge portion of the three-dimensional net 10. The back pad 21 and the cushion pad 31 are formed such that its thickness is gradually increased from the center portion of the seat surface to an outer circumferential portion, and also serve as a side support portion in left and right lateral portions thereof. The skin materials 22 and 32 can be formed of various fabrics such as woven fabric or knitted fabric. In the first exemplary embodiment, since the skin materials 22 and 32 are respectively made of the same material as that of the three-dimensional net 10, the entire seat surface has a sense of unity in design. Reference numeral 29 indicates a back board covering a rear surface of the seat back 2. Reference numeral 39 indicates a side shield covering a lateral portion of the seat cushion 3. The back board 29 and the side shield 39 are made of synthetic resin such as polypropylene.

Figure 2:
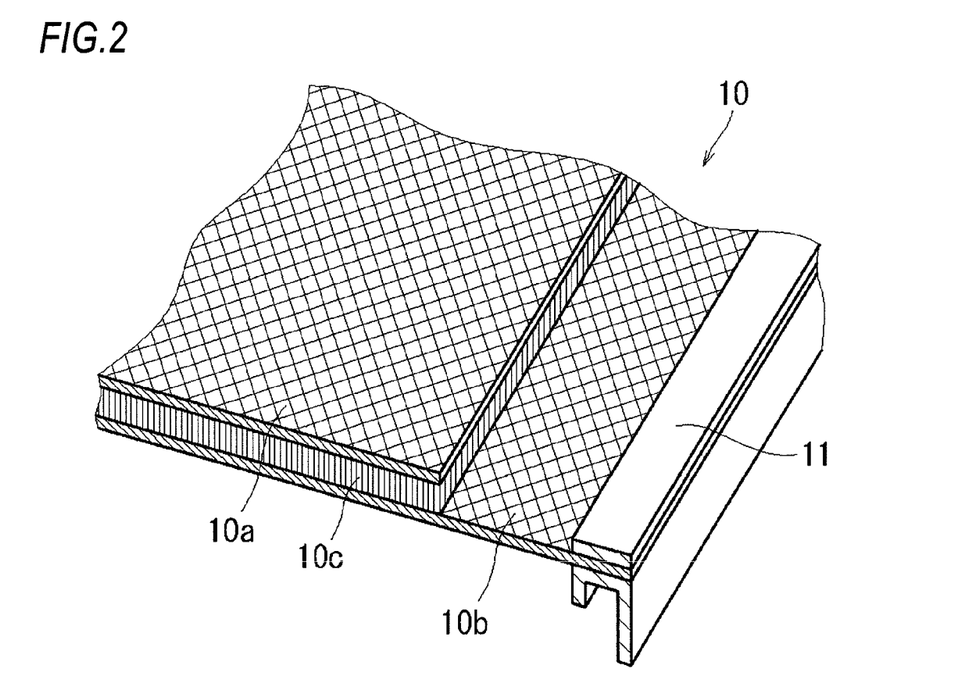
FIG. 2 is a partially sectional perspective view illustrating a three-dimensional woven knitted fabric according to the first exemplary embodiment.

As illustrated in FIG. 2, the center portion of the three-dimensional net 10 in the surface direction has a three-layered structure configured by a surface-layer-side base fabric 10a, a back-layer-side base fabric 10b, and an intermediate layer 10c that three-dimensionally connects the surface-layer-side base fabric 10a and the back-layer-side base fabric 10b. The surface-layer-side base fabric 10a and the back-layer-side base fabric 10b are made of a flexible woven fabric of a net shape, and the intermediate layer 10c is woven with a plurality of fibers being vertically arranged in a thickness direction between both base fabrics 10a and 10b. Accordingly, the three-dimensional net 10 has elasticity. Meanwhile, the edge portion of the three-dimensional net 10 has a single-layer structure configured by the back-layer-side base fabric 10b only, and a locking member 11 is integrally provided at an end portion of the three-dimensional net 10 configured by the back-layer-side base fabric 10b only. The locking member 11 is made of synthetic resin such as polypropylene and can be integrally formed (insert molding) on the end portion of the three-dimensional net 10 by injection molding in a state in which the end portion of the three-dimensional net 10 is placed in a mould. In the first exemplary embodiment, the locking member 11 is provided to surround the entire circumference of the three-dimensional net 10. The locking member 11 is formed in a hook shape with a fitting recess, which is provided to an inner surface thereof, to enable the locking member to fit into a seat frame which will be described later.

Figure 3:
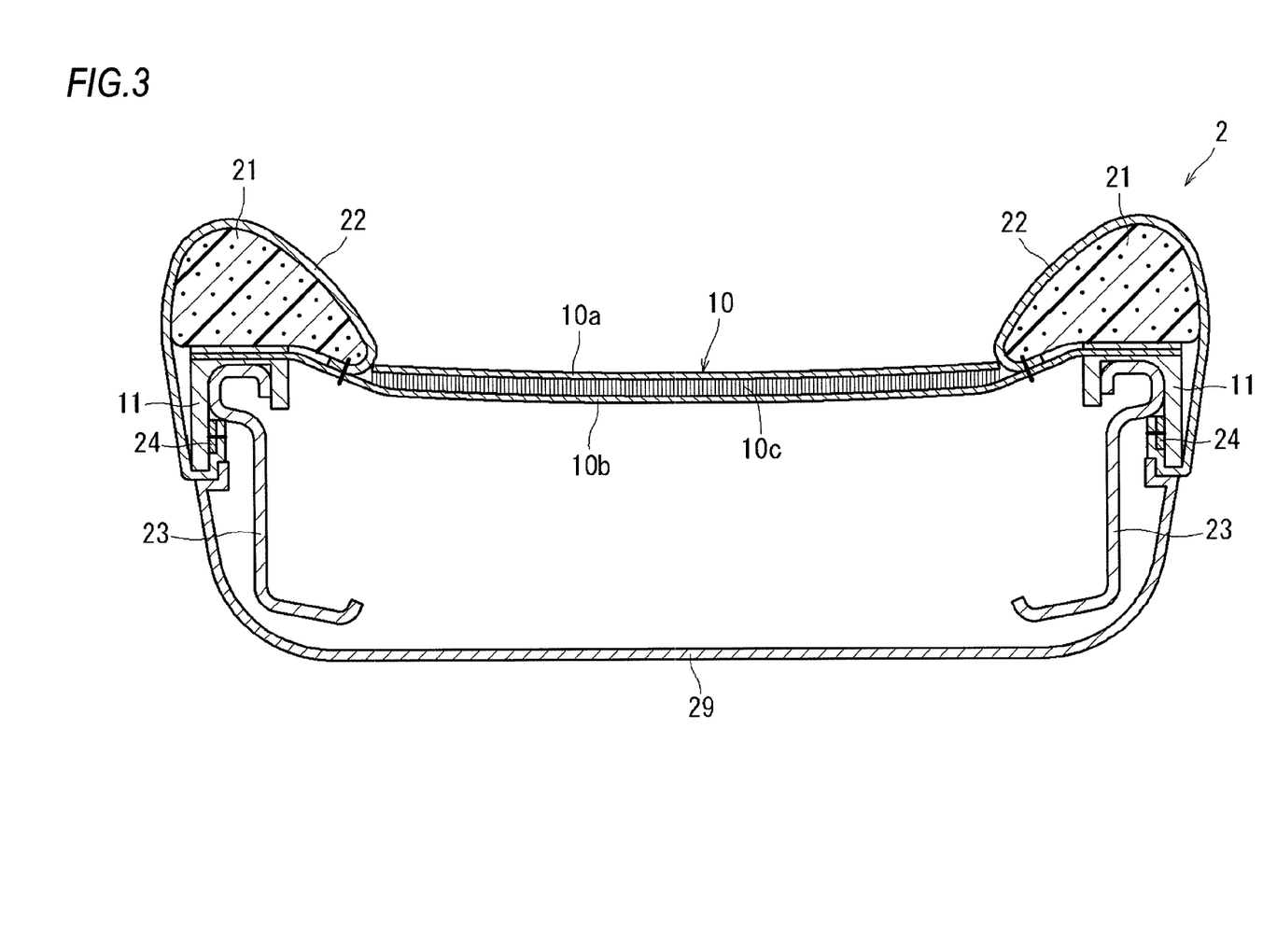
FIG. 3 is a cross-sectional view taken along the line III-III in FIG. 1.

The configuration of the seat back 2 provided with the three-dimensional net 10 in a tensioned state will now be described in detail. As illustrated in FIG. 3, the three-dimensional net 10 is tightly stretched by locking the locking member 11 to a back frame 23. The back frame 23 is a frame member made of metal forming a framework of the seat back 2 and is formed in a substantially gate shape. The locking member 11 is locked by fitting the fitting portion thereof to a front end portion (end portion of the seat surface side) of the back frame 23 so as to cover it. In this instance, an outer rear end portion (end portion opposite to the seat surface) of the locking member 11 and the end portion of the back board 29 are positioned adjacent to each other.

The back pad 21 and the skin material 22 are placed to cover the edge portion of the three-dimensional net 10. Specifically, one end (end portion of the center portion side of the seat surface) of the skin material 22 is sewed to the edge portion of the three-dimensional net 10, and the other end is interposed between the locking member 11 and the back board 29 while being trapped into the inner surface side of the locking member 11. In this instance, since a stopper piece 24 is adhered to the other end of the skin material 22 by sewing or the like, the other end of the skin material 22 is prevented from being released between the locking member 11 and the back board 29. The back pad 21 is wrapped by the skin material 22 in this state. At that time, the end portion of the back pad 21 at the center portion side of the seat surface and the end portion of the surface-layer-side base fabric 10a of the three-dimensional net 10 come into contact with each other or are adjacent to each other thereby to secure the continuity between the three-dimensional net 10 and the back pad 21 in design.

Figure 4:
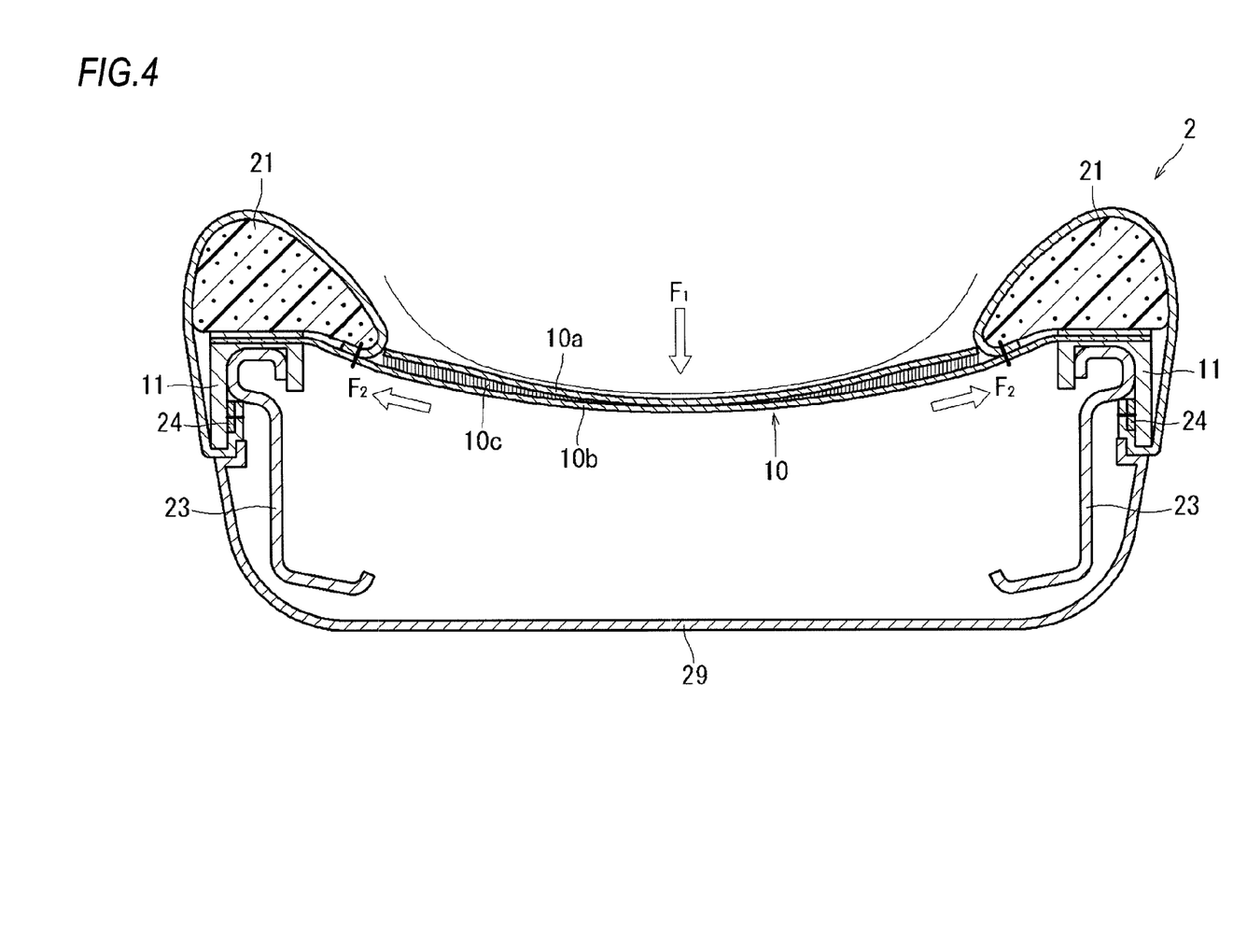
FIG. 4 is a cross-sectional view, corresponding to the line III-III in FIG. 1, illustrating a state in which a load is applied from a passenger.

With the above-described configuration, since the three-dimensional net 10 is tightly stretched on the seat surface of the seat back 2, if a passenger sits on the seat 1 and a load F1 is applied to the three-dimensional net 10, as illustrated in FIG. 4, the intermediate layer 10c is elastically compressed, and a tension F2 in a surface direction is applied only to the back-layer-side base fabric 10b provided with the locking member 11 and the load F1 applied from the passenger is received thereby. Meanwhile, since the end portion of the surface-layer-side base fabric 10a is a free end, the tension does not act on the surface-layer-side base fabric 10a, and can be freely deformed together with the intermediate layer 10c, thereby causing the three-dimensional net 10 to secure a good cushion property.

Figure 5:
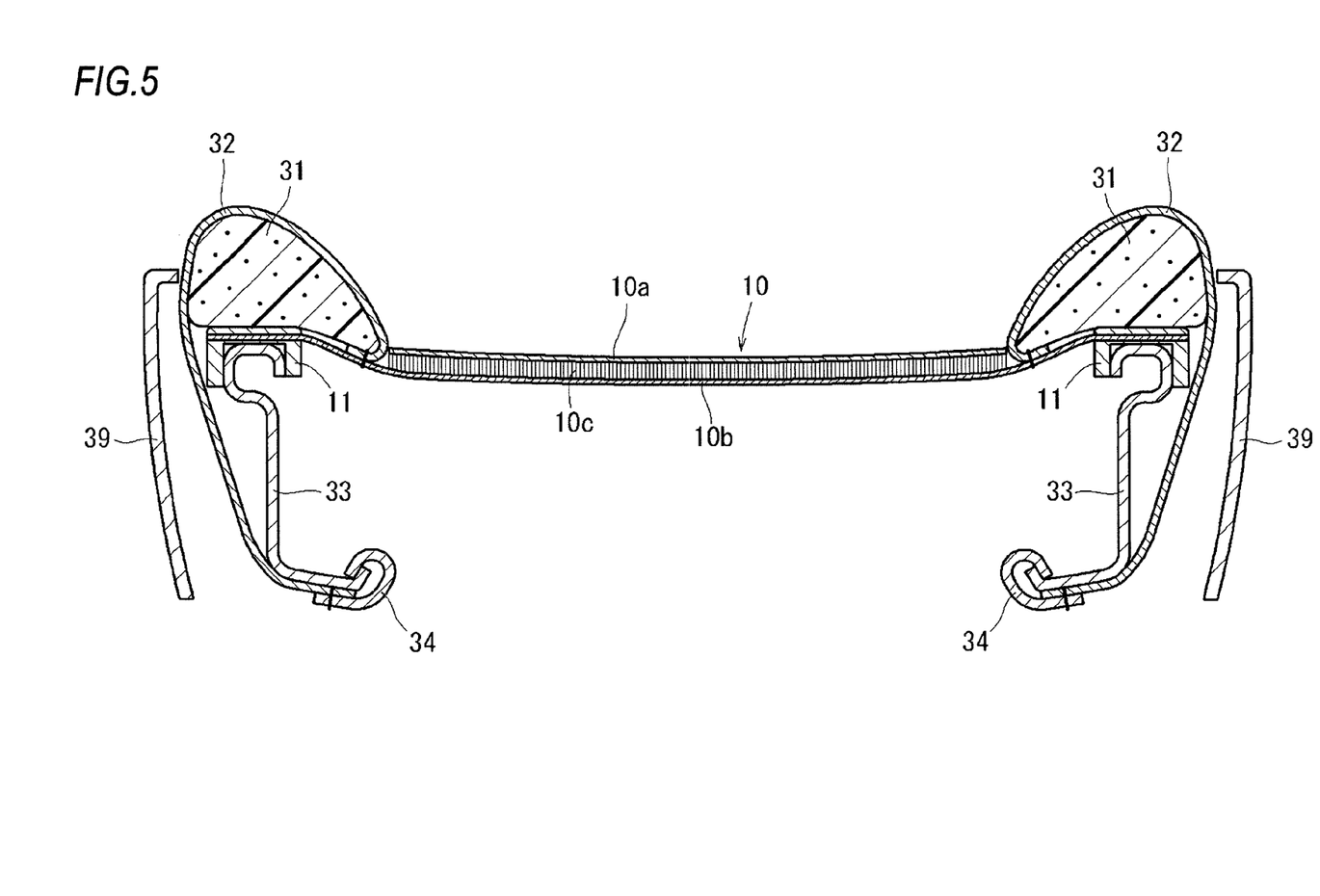
FIG. 5 is a cross-sectional view taken along the line V-V in FIG. 1.

The configuration of the seat cushion 3 provided with the three-dimensional net 10 in a tensioned state will now be described. As illustrated in FIG. 5, since the seat cushion 3 employs the same three-dimensional net 10 as the seat back 2, and the locking member 11 provided at the end portion thereof is locked to a cushion frame 33 by the same stretching method as the seat back 2, the stretching configuration of the three-dimensional net 10 will not be described in detail herein. Further, the seat cushion 3 is substantially identical to the seat back 2 in that one end (end portion of the center portion of the seat surface) of the skin material 32 is sewed to the edge portion of the three-dimensional net 10 and the cushion pad 31 is wrapped by the skin material 32. However, locking means provided to an other end of the skin material 32 differs from the configuration of the seat back 2.

Specifically, a J-shaped hook 34 made of synthetic resin is sewed on the other end of the skin material 32, and the J-shaped hook 34 is locked to a lower end portion (end portion opposite to the seat surface) of the cushion frame 33. In addition, similarly to the seat back in FIG. 4, in a case where load is applied to the three-dimensional net 10 from the passenger, the load applied from the passenger is received only by the back-layer-side base fabric 10b, and tension is not applied to the surface-layer-side base fabric 10a. As a result, the surface-layer-side base fabric 10a can be freely deformed together with the intermediate layer 10c, thereby causing the three-dimensional net 10 to secure a good cushion property.

Second Exemplary Embodiment

Figure 6:
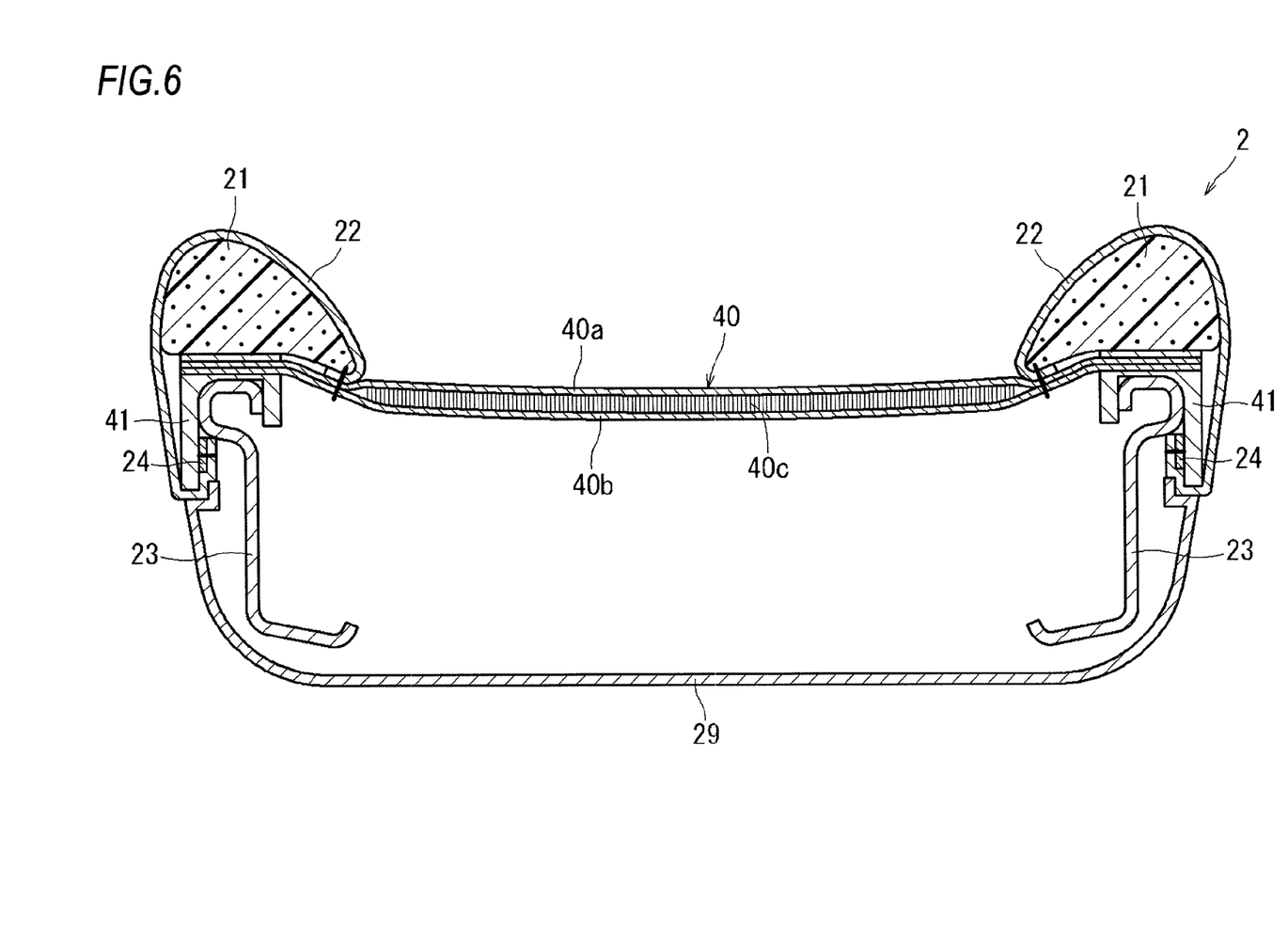
FIG. 6 is a cross-sectional view, corresponding to the line III-III in FIG. 1, illustrating a vehicle seat according to a second exemplary embodiment.

Next, the second exemplary embodiment of the present invention will be described. FIG. 6 is a cross-sectional view illustrating a seat back 2 provided with a three-dimensional net 40 according to the second exemplary embodiment in a tensioned state. As illustrated in FIG. 6, the second exemplary embodiment is substantially identical to the first exemplary embodiment in the configuration for installing the back pad 21 and the skin material 22, except for the configuration of the three-dimensional net 40.

Specifically, a center portion of the three-dimensional net 40 in a surface direction has a three-layered structure configured by a surface-layer-side base fabric 40a, a back-layer-side base fabric 40b and an intermediate layer 40c for three-dimensionally connecting the surface-layer-side base fabric 40a and the back-layer-side base fabric 40b. The intermediate layer 40c is woven, with a plurality of fibers being vertically arranged in a thickness direction between both base fabrics 40a and 40b. Accordingly, the three-dimensional net 40 has elasticity. Meanwhile, the edge portion of the three-dimensional net 40 has a double-layered structure configured by the surface-layer-side base fabric 40a and the back-layer-side base fabric 40b, which are directly laminated without the intermediate layer 10c therebetween. The locking member 41 is integrally provided at an end portion of the three-dimensional net 40 including not only the back-layer-side base fabric 40b but also the surface-layer-side base fabric 40a. A shape of the locking member 41, a method for forming it, and a method for locking it to the back frame 23 are substantially identical to those of the first exemplary embodiment.

The surface-layer-side base fabric 40a and the back-layer-side base fabric 40b are respectively made of a flexible woven knitted fabric of a net shape, but the surface-layer-side base fabric 40a has elasticity higher than that of the back-layer-side base fabric 40b. As means for enabling the surface-layer-side base fabric 40a to have more flexible fabric than the back-layer-side base fabric 40b, the surface-layer-side base fabric 40a may have a mesh looser than that of the back-layer-side base fabric 40b or the surface-layer-side base fabric 40a only may be woven from threads having good elasticity.

In the second exemplary embodiment in which the three-dimensional net 40 including the above configuration is tightly stretched, the end portion including the surface-layer-side base fabric 40a and the back-layer-side base fabric 40b is provided with the locking member 41, but the surface-layer-side base fabric 40a has the elasticity, that is, deformability, higher than that of the back-layer-side base fabric 40b. Therefore, the surface-layer-side base fabric 40a can turn aside the load applied from the passenger by its elasticity. While the load applied from the passenger is received by the back-layer-side base fabric 40b, the surface-layer-side base fabric 40a can be freely deformed together with the intermediate layer 40c. As a result, the three-dimensional net 40 can bring out the good original cushion property (level of sitting comfort). In addition, since the intermediate layer 40c is not formed at the edge portion, the three-dimensional net 40 has high flexibility at the edge portion, and the locking member 41 can be easily locked to the back frame 23. Furthermore, it is possible to prevent the tension from being uneven at the edge portion or prevent creases to be formed at the edge portion.

The three-dimensional net 20 according to the second exemplary embodiment can be tightly stretched on the seat cushion 3, and the effect obtained from the case is substantially identical to that of the seat back 2.

Modified Examples

Although typical embodiments of the present invention have been described above, the present invention is not limited thereto, and various modifications may be made without departing from the spirit or scope of the present invention. For example, the three-dimensional nets 10 and 40 are tightly stretched on both of the seat back 2 and the seat cushion 3 in the first and second exemplary embodiments, but the present invention is not limited thereto. That is, the three-dimensional net may be tightly stretched either of the seat back 2 and the seat cushion 3.

Further, the locking members 11 and 41 need not necessarily be provided to surround the entire circumference of the three-dimensional nets 10 and 40, and may be provided at a portion of the end portion.

In addition, the edge portions of the three-dimensional nets 10 and 40 are covered by the pad materials 21 and 31 and the skin materials 22 and 32 in the first and second exemplary embodiments, but the pad materials 21 and 31 and the skin materials 22 and 32 are not always necessary, and may be omitted from the configuration.

Furthermore, it is preferable that the surface-layer-side base fabric 10a has elasticity higher than that of the back-layer-side base fabric 10b also in the three-dimensional net 10 according to the first exemplary embodiment. This can further improve the cushion property of the three-dimensional net 10.

What is claimed is:

1. A vehicle seat including a three-dimensional woven knitted fabric, the three-dimensional woven knitted fabric comprising:
    a surface-layer-side base fabric;
    a back-layer-side base fabric; and
    an intermediate layer that is disposed between and three-dimensionally connects the surface-layer-side base fabric and the back-layer-side base fabric, the three-dimensional woven knitted fabric being tightly stretched on a seat frame by a locking member provided to an end portion thereof to define a seat surface,
    wherein an edge portion of the three-dimensional woven knitted fabric has a single-layer structure, which includes only the back-layer-side base fabric among the surface-layer-side base fabric, the back-layer-side base fabric and the intermediate layer, and
    wherein the locking member is provided to an end portion of the back-layer-side base fabric.

2. A vehicle seat according to claim 1,
    wherein the surface-layer-side base fabric has an elasticity that is higher than an elasticity of the back-layer-side base fabric.

3. A vehicle seat including a three-dimensional woven knitted fabric, the three-dimensional woven knitted fabric comprising:
    a surface-layer-side base fabric;
    a back-layer-side base fabric; and
    an intermediate layer that is disposed between and three-dimensionally connects the surface-layer-side base fabric and the back-layer-side base fabric, the three-dimensional woven knitted fabric being tightly stretched on a seat frame by a locking member provided to an end portion thereof to define a seat surface,
    wherein an edge portion of the three-dimensional woven knitted fabric has a double-layered structure, which includes the surface-layer-side base fabric and the back-layer-side base fabric which are directly laminated without the intermediate layer therebetween,
    wherein the locking member is provided to an end portion of the edge portion having the double-layered structure, and
    wherein the surface-layer-side base fabric has an elasticity that is higher than an elasticity of the back-layer-side base fabric.

4. A vehicle seat comprising:
    a seat frame;
    a woven knitted fabric including:
        a first base fabric;
        a second base fabric; and
        an intermediate layer that is disposed between the first base fabric and the second base fabric; and
    a locking member that tightly stretches the woven knitted fabric to the seat frame to define a seat surface,
    wherein the first base fabric, the intermediate layer and the second base fabric are laminated in this order in a first direction perpendicular to the seat surface,
    wherein a portion of the second base fabric extends further outwards in a second direction parallel to the seat surface than the first base fabric and the intermediate layer, and
    wherein the locking member is provided to the portion of the second base fabric that extends further outwards in the second direction.

* * * * *